Nov. 15, 1938.  C. KELLER  2,137,139

VARIABLE SPEED POWER TRANSMISSION DEVICE

Filed Sept. 21, 1936    2 Sheets-Sheet 1

Inventor
Curt Keller
By [signature]
Attorneys

Nov. 15, 1938.  C. KELLER  2,137,139
VARIABLE SPEED POWER TRANSMISSION DEVICE
Filed Sept. 21, 1936   2 Sheets-Sheet 2

Inventor
Curt Keller
By Attorneys

Patented Nov. 15, 1938

2,137,139

UNITED STATES PATENT OFFICE 2,137,139

VARIABLE-SPEED POWER TRANSMISSION DEVICE

Curt Keller, Zurich, Switzerland, assignor to Aktiengesellschaft fuer Technische Studien, Zurich, Switzerland, a corporation of Switzerland Application September 21, 1936, Serial No. 101,830
In Switzerland September 27, 1935

7 Claims. (Cl. 60—62)

The invention relates to a variable-speed power transmission device comprising at least one pump impeller which gives up energy to a working medium describing a closed circuit and operating in its turn at least one turbine wheel. The working mediums employed for such devices used for transforming a speed or torque have hitherto been liquids, preferably water.

In contradistinction hereto, in a device of the above mentioned type a gas, preferably compressed air, is used according to the present invention as working medium, i. e. a medium capable of being compressed. Furthermore, according to the present invention such a device is also provided with means permitting of altering the gas density, so that the weight of the working medium circulating in the device can be varied. It is accordingly possible to meet all practical requirements as regards the power that can be transmitted by such a device with a few models, which is of great advantage from the manufacturer's point of view. By choosing a relatively high gas pressure it is also possible, even when a comparatively large power has to be transmitted, to provide for a variable-speed transmission device of small dimensions.

If a gas is employed in place of water, all formation of rust is further eliminated, so that all walls remain clean and the friction losses can accordingly be reduced to a minimum. In this manner it is possible to increase the efficiency of the device. Further all danger of cavitation is avoided, such as occurs in the case of hydraulic variable-speed gearings, due to evaporation of the circulating working liquid. Consequently, in a device according to the present invention high circumferential speeds can be adopted, the latter being only limited by the tensile strength of the materials employed.

The circulating working gas can be conveniently heated in order to increase its velocity of sound, which permits of the admissible circumferential velocity of the runner wheels being increased.

By the employment of a gas as working medium it is further possible to increase the efficiency of the pump impeller and turbine runner as compared with those through which a liquid flows, since in runner wheels through which gas flows, it is possible to operate with high Reynold's numbers as regards the aerofoil profile of the blades, which permits of the friction losses on the blades being reduced.

The pump impeller can be suitably designed of the propeller type. An impeller of this type permits of large quantities of circulating working medium being brought to the required pressure even when the diameter of same is relatively small, since an impeller of the propeller type operates with good efficiency at high specific speed and with large volume capacity. The latter is of particular importance because the flow in the pump impeller, contrary to the turbine runner, takes place in conjunction with a rise in pressure, which, as is well known, renders the attainment of a good efficiency particularly difficult. The blades of such a propeller can conveniently be mounted in an adjustable manner, and these blades as also the blades of the turbine runner wheel can, if desired, be made of light metal, since such blades are not attacked by a gaseous working medium, in contradistinction to liquids.

Preferred embodiments of the invention will now be described in connection with the accompanying drawings in which.

Figure 1:
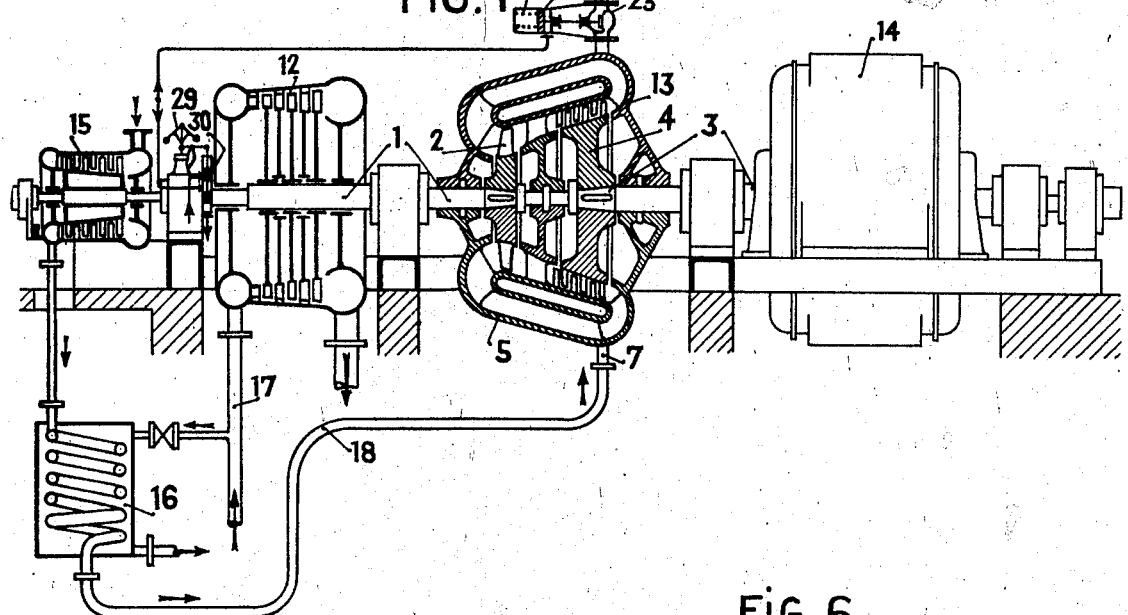
Fig. 1 is partly a vertical sectional view and partly a front view of a plant comprising a steam turbine driving directly an air blower of the axial type and by means of a variable-speed power transmission gear an electric generator.

In the specific embodiment of the invention, shown in Fig. 1 a steam turbine 12 drives through the intermediary of a variable-speed power transmission gear 13 an electric generator 14 and directly an air blower 15 of the axial type. The air delivered by the latter is heated in a heat exchanger 16 by means of steam tapped from the supply pipe 17 of the steam turbine 12. The heated up air flows through a pipe 18 into the variable-speed power transmission gear 13 where it acts as working fluid.

Figure 2:
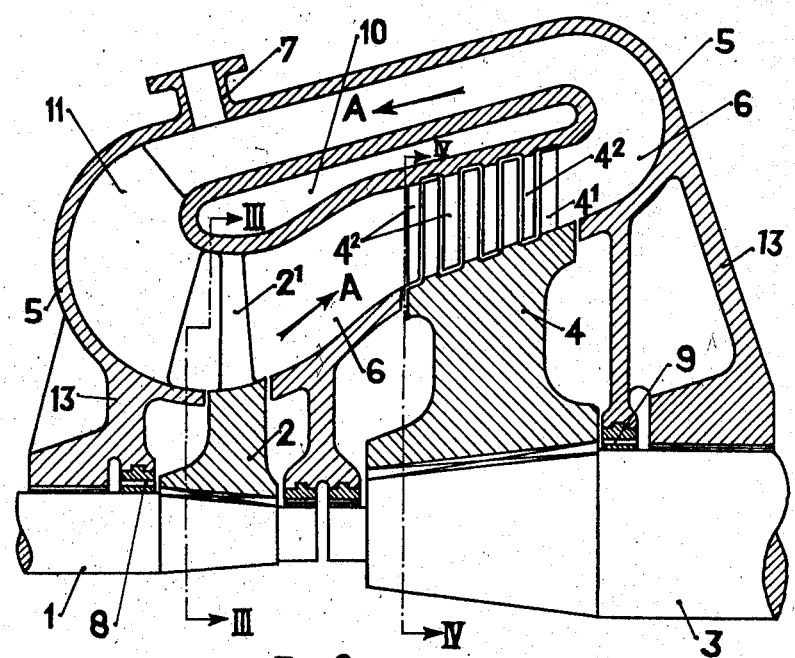
Fig. 2 is a longitudinal sectional view on an enlarged scale of a part of the variable-speed power transmission gear.
Figures 3, 4:
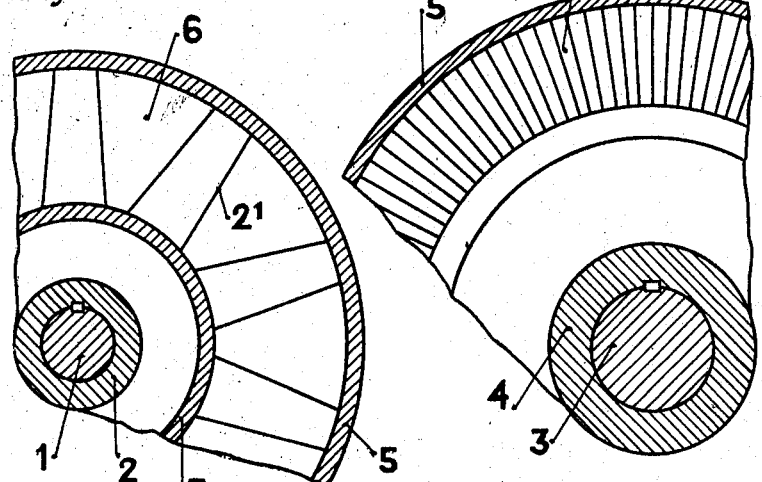
Fig. 3 is a sectional view on the line III—III of Fig. 2.
Fig. 4 is a sectional view on the line IV—IV of Fig. 2.

A part of the power transmission gear is shown on an enlarged scale in Figs. 2–4. Referring in particular to the latter figures it will be seen that the shaft 1 of the turbine 12 constitutes the primary shaft of this gear 13. To the shaft 1 a pump impeller 2 is keyed which is designed as a high-speed axial flow propeller wheel. 3 is the secondary shaft to which a turbine runner 4 is keyed. This turbine runner 4 is designed as a slow-running multi-stage reaction wheel. The shaft 3 gives up power to the generator 14. 5 designates the stationary casing of the gear 13, this casing being provided with a circulating channel 6 forming a closed circuit. This channel is also partly limited by the discs of the wheels 2, 4, the blades of which $2^1$ and $4^1$ respectively project into this channel. $4^2$ denotes guide blades fixed to the stationary casing 5 and allotted to the turbine runner 4. 11 denotes a guide apparatus arranged before the pump impeller 2 and united rigidly to the walls of the casing 5. The circulating channel 6, the walls of which are perfectly smooth, is filled with compressed air delivered by the blower 15 and introduced into said channel 6 through a branch 7, the latter being shown in Fig. 2 in another position than in Fig. 1. Any leakage losses which may occur, in spite of the provision of the stuffing boxes 8, 9, can be compensated by the introduction of additional compressed air from said blower 15.

In the gear described, the pump impeller 2 gives up energy to the air enclosed in the channel 6, the pressure of said air lying at any point of this channel above atmospheric pressure. This air is caused to circulate in the channel 6 in the direction of the arrow A and gives up in its turn energy to the turbine runner 4. The air thereby describes a closed circuit, whereby the guide apparatus 11 continuously ensures the correct guiding of same to the pump impeller 2. By suitably designing the blades $2^1$ of the pump impeller 2 and the blades $4^1$, $4^2$ of the turbine runner 4, it is possible to attain that the axial flow pump impeller 2 rotates at a might higher speed than the turbine runner 4, so that the speed of the primary shaft 1 is transformed in the gear into a slower one. The pump impeller is, as shown, conveniently designed of the single-stage type and the turbine runner of the multi-stage type, whilst the angles, the shapes and the pitch of the blading of the wheels are designed in such a way that the specific speed of the pump impeller is at least twice that of the turbine runner.

Figure 5:
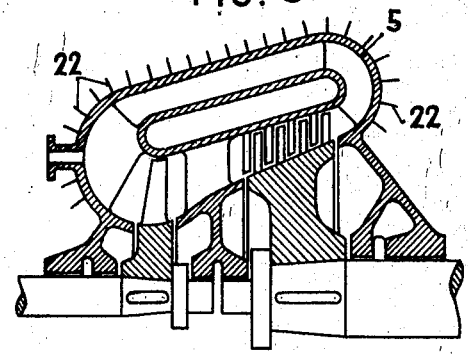
Fig. 5 is a longitudinal sectional view of a part of a variable-speed power transmission gear, the casing of which is provided with ribs for air cooling, whilst.
Figure 6:
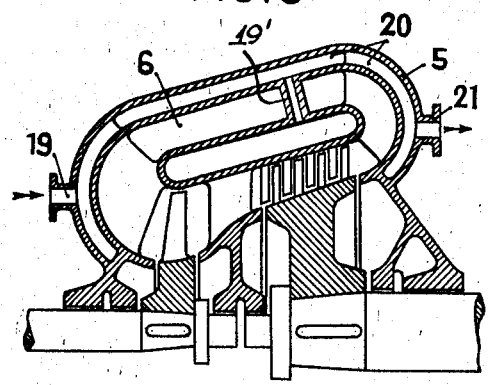
Fig. 6 is a similar sectional view of a part of a variable-speed power transmission gear, the casing of which is provided with water cooling.

For the purpose of eliminating the energy converted in the gear into heat owing to friction, a cooling medium, for instance water, can be introduced in the manner shown in Fig. 6 through a branch 19 into a hollow space 20 of the casing 5, the heated cooling water being discharged through branch 21. Such cooling water can also be supplied to the space 10 (Fig. 2) which is bounded by the inner walls of the channel 6, through connections leading across the gas passage, one of such connections being indicated at 19' in Fig. 6, the other being similar but not visible in the figure which shows a half section. As shown in Fig. 5, the casing 5 can also be provided with ribs 22 for air cooling.

The power which can be transmitted by the gear described depends upon the density, i. e. weight of the air in circulation. In order to avoid excessive dimensions of the gear, it is advisable to ensure that a pressure of some atmospheres, preferably of more than five atm., shall exist in the circulating channel 6 even at the point where the lowest pressure prevails. With regard to the upper limit, the pressure of the air is subject to no restriction.

By changing the pressure of the air circulated in the channel 6, which can be effected by introducing air of higher pressure through the branch 7, or by discharging air from the channel 6 through the valve 23 shown in Fig. 1, the power transmitted by the gear can be changed very quickly in the simplest manner and within the widest limits. This regulation can be effected automatically by any convenient means in dependency on the gear load. Such means are shown in Fig. 1 where the governor 29 of the steam turbine 12 controls the position of a piston 30 controlling in its turn the supply of oil under pressure to one side of a piston 31. The latter is also acted upon by a spring 32 and it is operatively connected to the valve 23.

Figure 9:
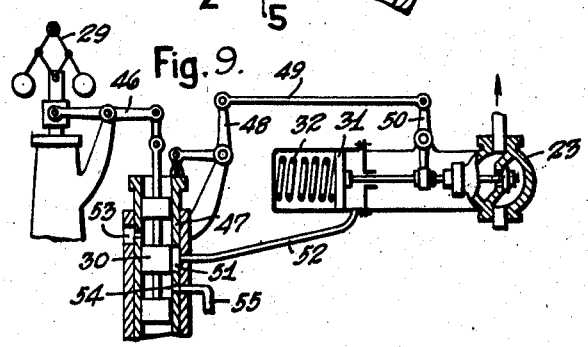
Fig. 9 is a diagram showing a conventional governor mechanism which may be used to regulate pressure of the gaseous medium in the circuit.

Fig. 9 illustrates diagrammatically one governor mechanism of known type which might be used. No novelty is here claimed for the governor mechanism per se.

In Fig. 9 the governor 29 tilts lever 46 clockwise on rise of turbine speed and thus lowers the balanced piston valve 30. Valve 30 works in a vertically shiftable seat bushing 47 which is connected by bell crank 48, link 49 and lever 50 with the stem of valve 23 so as to lower the sleeve as the valve 23 opens. Valve 30 in its neutral position just laps port 51 in seat bushing 47 which is connected by pipe 52 with the space to the right of piston 31. Slight displacement of valve 30 downward with reference to bushing 47 connects port 51 with exhaust port 53, while a similar relative displacement of the valve upward connects port 51 with supply port 54 to which oil under pressure is supplied by pipe 55. Ports 53 and 54 are in sleeve 47 as shown.

The above will be recognized as a familiar, governor-controlled servo-motor mechanism. Any equivalent might be substituted.

Figure 8:
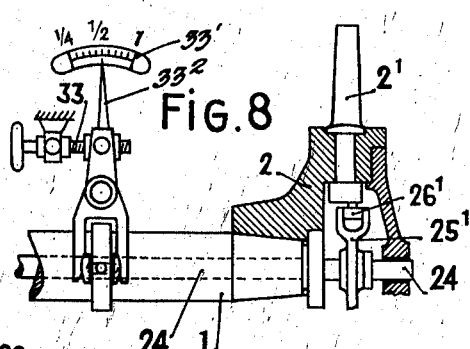
Fig. 8 shows details of a mechanism allowing adjustment of the blades of a pump impeller.

The blades $2^1$ of the pump impeller 2 can be adjustable, as shown in Fig. 8. In such a case it is possible to transform the torque between the shafts 1 and 3 in a simple manner with the aid of the gear. In Fig. 8, reference 24 denotes a rod that can be adjusted axially by means of a hand lever control 33. To the rod 24 is fixed a disc $25^1$ cooperating with rolls $26^1$, one for each blade, the rolls being journaled in crank pins on the blade hubs. Of the blades only one is shown; on each shaft of the blades $2^1$ is mounted eccentrically such a roll $26^1$. By means of this hand control 33 the ratio between the revolutions of the shaft driving the pump impeller and the shaft connected to the turbine runner can be varied. The speed ratio of shafts 3 and 1 is indicated by a pointer $33^2$ and dial $33^1$, clearly shown in Fig. 8. The rod 24 can also be displaced axially in dependency on the power to be transmitted by the gear, that is to say, the dial just mentioned may be graduated in power units rather than speed ratios, in which event this dial permits the operator to control in relation to power transmitted.

Figure 7:
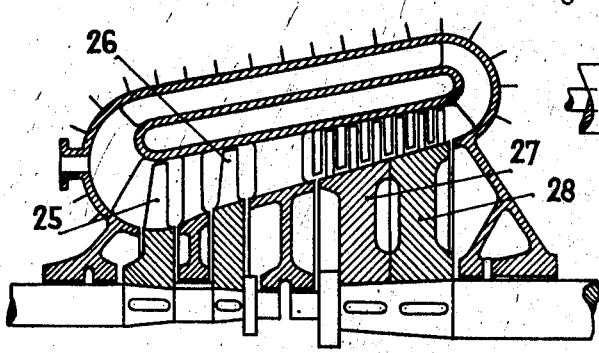
Fig. 7 is a longitudinal sectional view of a part of a variable-speed power transmission gear having two pump impellers arranged in series and two turbine runners also arranged in series.

If necessary, a number of pump impellers and turbine runners can be disposed in one and the same casing. Hereby a number of wheels of the same type can be arranged in series, as shown in Fig. 7, where 25, 26 denote two pump impellers and 27, 28 two turbine runners.

The walls of the casing 5 bounding the closed circuit for the working medium and the turbine runner or runners can conveniently be designed in such a way that the working gas, with the exception of the pump impeller or impellers, in which a rise in pressure takes place, only flows under acceleration, i. e. with pressure drop.

As working medium any kind of gas can be considered, i. e. besides air also nitrogen, helium or the like, may be used.

The variable-speed power transmitting gear according to the present invention may be used in connection with any device generating power and any device to be driven.

What is claimed is:—

1. A variable speed power transmitting gear, comprising in combination means forming a closed circuit in which a gaseous medium at higher than atmospheric pressures may be caused to circulate; a driving unit comprising a fast running axial flow propeller wheel having blades of aerofoil profile; a driven element comprising a multistage slow moving reaction wheel, said wheels being in the path of said circulating medium; and means for varying the density and consequently the weight of the gaseous medium moving in said closed circuit in order to regulate the power transmitted, such variation being in a range above atmospheric pressure.

2. The combination defined in claim 1, in which the specific speed of the driving element is at least twice as high as the specific speed of the driven element.

3. The combination defined in claim 1, in which the blades of the driving element are angularly adjustable.

4. The combination defined in claim 1, in which the circulating gaseous medium is heated by heat introduced from the exterior, whereby the velocity of sound in the medium and consequently the maximum permissible circumferential velocity of the wheels is increased.

5. The combination defined in claim 1, in which the minimum pressure on the gaseous medium in said circuit is at least 5 atmospheres.

6. The combination defined in claim 1, in which the driving element comprises two propeller wheels of the type specified arranged in tandem and without interposition of a stage of the reaction wheel.

7. The combination defined in claim 1, in which the means forming the closed circuit are so formed as to present a decreasing cross-sectional area of flow between the driven and driving units in the direction of flow of the medium, so that the working medium flows under acceleration and hence with pressure reduction throughout the circuit except in its passage through the driving element, in which a pressure rise takes place.

CURT KELLER.